United States Patent
Zhu et al.

(10) Patent No.: US 9,086,101 B2
(45) Date of Patent: Jul. 21, 2015

(54) PLANAR TORSION SPRING FOR ROBOT JOINT

(71) Applicant: ZHEJIANG UNIVERSITY, Hangzhou (CN)

(72) Inventors: Qiuguo Zhu, Hangzhou (CN); Rong Xiong, Hangzhou (CN); Jian Chu, Hangzhou (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 14/056,866

(22) Filed: Oct. 17, 2013

(65) Prior Publication Data
US 2014/0045600 A1    Feb. 13, 2014

Related U.S. Application Data

(63) Continuation of application No. PCT/CN2012/079317, filed on Jul. 30, 2012.

(30) Foreign Application Priority Data

Apr. 17, 2012    (CN) .......................... 2012 1 0112069

(51) Int. Cl.
*F16D 3/68* (2006.01)
*B25J 9/00* (2006.01)
(Continued)

(52) U.S. Cl.
CPC ................. *F16D 3/68* (2013.01); *B25J 9/0015* (2013.01); *B25J 17/00* (2013.01); *B25J 19/0091* (2013.01); *F16F 1/027* (2013.01)

(58) Field of Classification Search
CPC ...... B25J 17/00; B25J 19/0091; B25J 9/0015; F16D 3/68; F16F 1/027; F16F 1/14

USPC ........................................ 267/154; 901/15, 28
See application file for complete search history.

(56) References Cited

U.S. PATENT DOCUMENTS 2,690,529 A * 9/1954 Lindblad ..................... 335/228
2,767,973 A * 10/1956 Ter Veen et al. ........... 73/514.31
(Continued)

FOREIGN PATENT DOCUMENTS

| CN | 2003-74585 A | 3/2003 |
|---|---|---|
| CN | 101318331 A | 12/2008 |

(Continued)

OTHER PUBLICATIONS

Chinese First Examination Report of corresponding China patent Application No. 201210112069.4, dated Dec. 20, 2013.
(Continued)

*Primary Examiner* — Robert A Siconolfi
*Assistant Examiner* — Charles Poon
(74) *Attorney, Agent, or Firm* — J.C. Patents

(57) ABSTRACT

The present invention discloses a planar torsion spring for a robot joint, including a torsion spring outer ring, a torsion spring inner ring and a plurality of elastic bodies; the elastic bodies are uniformly distributed around the circumference and connected with the torsion spring outer ring and the torsion spring inner ring respectively at their two ends; each elastic body is composed of two symmetrical elastic body units, each elastic body unit includes an outer circular hole slot, an inner circular hole slot and a connecting beam; the connecting beam connects respectively between the torsion spring inner ring and the inner circular hole slot, the inner circular hole slot and the outer circular hole slot, the outer circular hole slot and the torsion spring outer ring; a wide-angle deformation of the torsion spring is achieved through a series of elastic deformation of the inner and outer circular hole slot.

1 Claim, 2 Drawing Sheets

(51) Int. Cl.
    *B25J 17/00*     (2006.01)
    *B25J 19/00*     (2006.01)
    *F16F 1/02*     (2006.01)

(56) References Cited

U.S. PATENT DOCUMENTS

| | | | | |
|---|---|---|---|---|
| 3,598,389 | A | 8/1971 | Kohler | 267/161 |
| D472,824 | S * | 4/2003 | Raab et al. | D10/63 |
| 6,904,691 | B2 * | 6/2005 | Raab et al. | 33/503 |
| 7,819,132 | B2 | 10/2010 | Etheridge et al. | 137/539 |
| 2010/0145510 | A1 * | 6/2010 | Ihrke et al. | 700/245 |
| 2011/0067517 | A1 | 3/2011 | Ihrke et al. | 74/490.03 |

FOREIGN PATENT DOCUMENTS

| | | | |
|---|---|---|---|
| CN | 101479500 A | 7/2009 | |
| CN | 101526662 A | 9/2009 | |
| CN | 102152319 A | 8/2011 | |
| CN | 102632508 B | 4/2015 | |
| JP | 2001-304316 A | 10/2001 | |
| JP | 2001304316 A | * 10/2001 | F16F 1/18 |
| JP | 2003-14022 A | 1/2003 | |
| KR | 10-2011-0024834 | 3/2011 | |

OTHER PUBLICATIONS

International Search Report of corresponding International Application No. PCT/CN2012/079317, dated Jan. 24, 2013.

* cited by examiner

PLANAR TORSION SPRING FOR ROBOT JOINT

CROSS-REFERENCE TO RELATED APPLICATIONS

This application is a continuation of International Application No. PCT/CN2012/079317, filed on Jul. 30, 2012, which claims the priority benefit of China Patent Application No. 201210112069.4, filed on Apr. 17, 2012. The contents of the above identified applications are incorporated herein by reference in their entireties.

FIELD OF THE TECHNOLOGY

The present invention relates to the technical field of robotics, and in particular to a planar torsion spring for a robot joint.

BACKGROUND

A robot joint is an important component of a robot system, which directly affects overall performance of the robot system. In recent years, with rapid development of service robot, relationship between robot and human becomes increasingly closer, and whether a robot system can have a good interactivity with human and environment becomes the focus of attention.

In conventional robot design, the design method of a joint mainly adopts a rigid-type design, where motors, reducers etc. are used as driving units of a robot joint. Such design of a robot joint lacks a flexible unit, resulting in that the robot joint is easily damaged by an external impact, thus directly affecting normal operation of the robot. In recent years, designers have turned their attention to methods of designing flexible joints and provided methods of designing a flexible joint having a force/torque transducer and serial elastic driving joint etc., so that the effect of the external impact on the operating joint in a robot can be avoided, thus creating a good condition for interaction between the robot, human and environment. However, anti-external impact performance of a flexible joint based on a force/torque transducer leaves much to be desired because the joint itself does not possess flexibility, the joint based on serial elastic driving possesses fine anti-impact and force sensing performance, but most of the joints adopt conventional spiral springs, and it is difficult to design a smaller, lighter joint with a compact structure. WANG Liquan et al. of Harbin Engineering University developed an elastic driving rotary joint disclosed in Chinese patent No. CN 102152319A and a double-serial elastic actuator disclosed in Chinese patent No. CN 101318331, both of which adopt the conventional spiral spring. Planar torsion spring for a robot joint has not been developed in China.

SUMMARY

The present invention provides a planar torsion spring for a robot joint, which is embedded into the robot joint, thus solving the problem of safe interaction among robot, human and environment. At the same time, the planar torsion spring solves the problem of occupying large space and looseness of structure of a conventional spring. The present invention changes the mode of the conventional torsion spring, adapts to improve the existing robot and the robot arm joint, and facilitates upgrading of the robot.

The object of the present invention is achieved by the following technical solution: a planar torsion spring for robot joint including a torsion spring outer ring, a torsion spring inner ring and a plurality of elastic bodies; the elastic bodies are uniformly distributed around the circumference and connected with the torsion spring outer ring and the torsion spring inner ring respectively at their two ends; each elastic body is composed of two symmetrical elastic body units, each elastic body unit includes an outer circular hole slot, an inner circular hole slot and a connecting beam; the connecting beam connects respectively between the torsion spring inner ring and the inner circular hole slot, the inner circular hole slot and the outer circular hole slot, the outer circular hole slot and the torsion spring outer ring; a plurality of outer ring threaded holes are uniformly distributed on the torsion spring outer ring; a plurality of inner ring unthreaded holes are uniformly distributed on the torsion spring inner ring.

The beneficial effect of the present invention is that, when the torsion spring inner ring of the planar torsion spring rotates, the inner circular hole slot is drove to elastically deform through the connecting beam, the inner circular hole slot then drives the outer circular hole slot to elastically deform through the connecting beam. A wide-angle deformation of the torsion spring is thus achieved through a series connection elastic deformation of the inner circular hole slot and the outer circular hole slot. The elasticity of the torsion spring can be improved by thickening the walls of the inner circular hole slot and the outer circular hole slot and by widening the connecting beam and also by increasing the quantity of the elastic body distributed around the circumference. The planar torsion spring provided by the present invention possesses flexibility and has a more compact structure, and a more flexible design, thus is adapted as a joint for a robot and a robot arm.

DETAILED DESCRIPTION

The present invention will be further described in combination with the accompany drawings.

Figure 1:
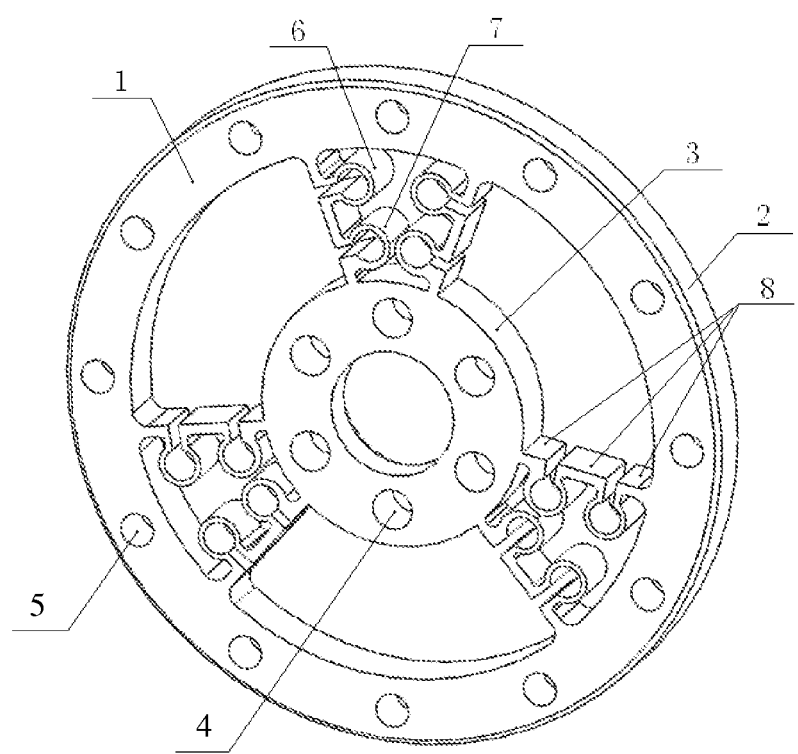
FIG. 1 is a perspective view of a planar torsion spring.
Figure 2:
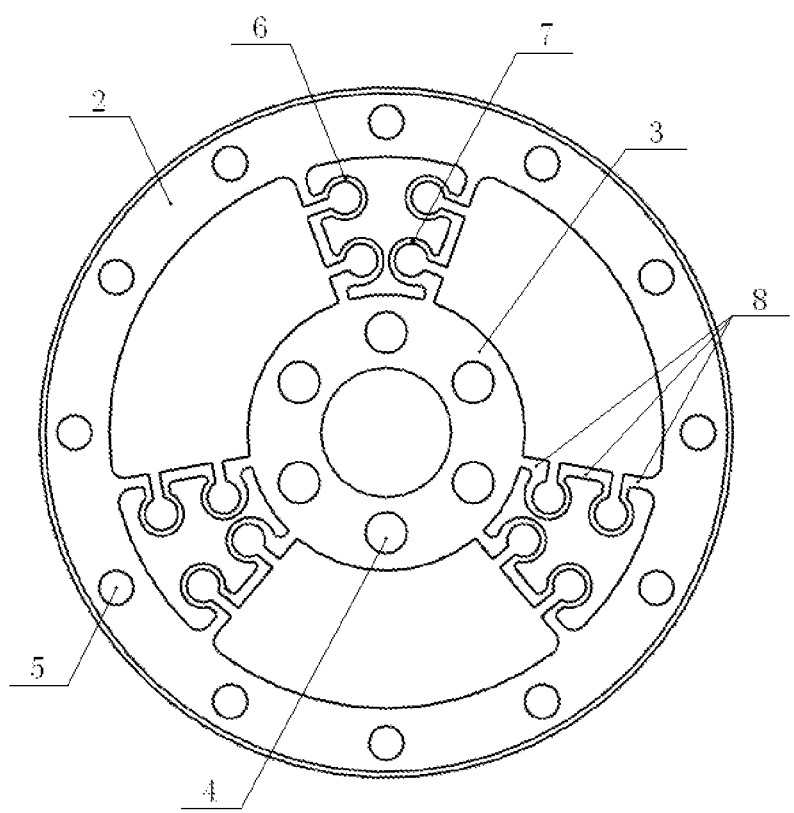
FIG. 2 is a plane view of the planar torsion spring;
1: planar torsion spring, 2: torsion spring outer ring, 3: torsion spring inner ring, 4: inner ring unthreaded hole, 5: outer ring threaded hole, 6: outer circular hole slot, 7: inner circular hole slot, 8: connecting beam.

As shown in FIG. 1 and FIG. 2, a planar torsion spring 1 according to an embodiment of the present invention includes a torsion spring outer ring 2, a torsion spring inner ring 3 and a plurality of elastic bodies, the elastic bodies are uniformly distributed around the circumference and connected with the torsion spring outer ring 2 and the torsion spring inner ring 3 respectively at their two ends. Each elastic body is composed of two symmetrical elastic body units, each elastic body unit includes an outer circular hole slot 6, an inner circular hole slot 7 and a connecting beam 8, the connecting beam 8 connects respectively between the torsion spring inner ring 3 and the inner circular hole slot 7, the inner circular hole slot 7 and the outer circular hole slot 6, the outer circular hole slot 6 and the torsion spring outer ring 2. A plurality of outer ring threaded holes 5 are uniformly distributed on the torsion spring outer ring 2, for connection with joint load. A plurality of inner ring unthreaded holes 4 are uniformly distributed on the torsion spring inner ring 3, for connection with joint input.

In the figures, the number of the elastic bodies is 3, but in actual production process, the number of the elastic bodies can be adjusted according to the magnitude of elastic force.

The working process of the present invention is as follow: when the torsion spring inner ring 3 of the planar torsion spring 1 rotates, the inner circular hole slot 7 is drove to elastically deform through the connecting beam 8, the inner circular hole slot 7 then drives the outer circular hole slot 6 to elastically deform through the connecting beam 8, a wide-angle deformation of the torsion spring is thus achieved through a series of elastic deformation of the inner circular hole slot 7 and the outer circular hole slot 6. Thus the rotation of the joint input connected with the torsion spring inner ring 3 is flexibly transmitted to the joint load connected with the torsion spring outer ring 2.

The elasticity of the torsion spring can be enhanced by increasing the thickness of the walls of the inner circular hole slot 7 and the outer circular hole slot 6, by increasing the width of the connecting beam 8 and also by increasing the quantity of the elastic bodies distributed around the circumference. The planar torsion spring provided by the present invention possesses flexibility and has a more compact structure, and can be designed more flexibly, which changes the design mode of a conventional torsion spring and thus is adapted as a joint for a robot and a robot arm.

What is claimed is:

1. A planar torsion spring, comprising: a torsion spring outer ring (2), a torsion spring inner ring (3) and a plurality of elastic bodies; wherein the elastic bodies are uniformly distributed around a circumference and connected with the torsion spring outer ring (2) and the torsion spring inner ring (3) respectively at their two ends; each elastic body is composed of two symmetrical elastic body units, each elastic body unit includes an outer circular hole slot (6), an inner circular hole slot (7) and a connecting beam (8); for each elastic body unit, the outer circular hole slot (6) and the inner circular hole slot (7) are arranged at a same side with respect to the connecting beam (8), the connecting beam (8) represents a straight-line shape and connects respectively between the torsion spring inner ring (3) and the inner circular hole slot (7), the inner circular hole slot (7) and the outer circular hole slot (6), the outer circular hole slot (6) and the torsion spring outer ring (2); a plurality of outer ring threaded holes (5) are uniformly distributed on the torsion spring outer ring (2); a plurality of inner ring unthreaded holes (4) are uniformly distributed on the torsion spring inner ring (3).

* * * * *